(12) United States Patent
Gotzig et al.

(10) Patent No.: US 11,143,144 B2
(45) Date of Patent: Oct. 12, 2021

(54) ROCKET PROPULSION SYSTEM AND METHOD FOR OPERATING A ROCKET PROPULSION SYSTEM

(71) Applicant: Airbus DS GmbH, Taufkirchen (DE)

(72) Inventors: Ulrich Gotzig, Bad Friedrichshall (DE); Malte Wurdak, Moeckmuehl (DE)

(73) Assignee: Arianegroup GmbH, Taufkirchen (DE)

( * ) Notice: Subject to any disclaimer, the term of this patent is extended or adjusted under 35 U.S.C. 154(b) by 639 days.

(21) Appl. No.: 15/598,468

(22) Filed: May 18, 2017

(65) Prior Publication Data
US 2017/0335800 A1 Nov. 23, 2017

(30) Foreign Application Priority Data
May 20, 2016 (DE) .......................... 102016208730.4

(51) Int. Cl.
*F02K 9/64* (2006.01)
*F02K 9/68* (2006.01)
*F02K 9/52* (2006.01)
*C25B 1/04* (2021.01)
*C25B 15/08* (2006.01)
*F02K 9/42* (2006.01)
(Continued)

(52) U.S. Cl.
CPC ................. *F02K 9/64* (2013.01); *C25B 1/04* (2013.01); *C25B 15/08* (2013.01); *F02K 9/425* (2013.01); *F02K 9/44* (2013.01); *F02K 9/52* (2013.01); *F02K 9/68* (2013.01); *F02K 9/95* (2013.01); *F05D 2220/80* (2013.01); *F05D 2240/35* (2013.01); *F05D 2260/232* (2013.01); *Y02E 60/36* (2013.01)

(58) Field of Classification Search
CPC ..... F02K 9/68; F02K 9/52; F02K 9/40; F02K 9/95; F02K 9/64
See application file for complete search history.

(56) References Cited

U.S. PATENT DOCUMENTS 4,698,965 A * 10/1987 Delchev .................. B01D 7/02
149/1
4,841,723 A 6/1989 Lau et al.
(Continued)

FOREIGN PATENT DOCUMENTS

RU 2215891 C2 11/2003

OTHER PUBLICATIONS

German Search Report, dated Feb. 6, 2017, priority document.
(Continued)

*Primary Examiner* — Todd E Manahan
*Assistant Examiner* — Kyle Robert Thomas
(74) *Attorney, Agent, or Firm* — Greer, Burns & Crain, Ltd.

(57) ABSTRACT

A rocket propulsion system comprises a combustion chamber, a hydrogen-oxygen supply system connected to the combustion chamber, which hydrogen-oxygen supply system is configured to conduct hydrogen and oxygen into the combustion chamber, and a coolant supply system connected to the combustion chamber, which coolant supply system is configured to conduct a combustible coolant into the combustion chamber. An ignition system of the rocket propulsion system is configured to initiate combustion of the hydrogen-oxygen-coolant mixture in the combustion chamber.

12 Claims, 6 Drawing Sheets

(51) Int. Cl.
*F02K 9/44* (2006.01)
*F02K 9/95* (2006.01)

(56) References Cited

U.S. PATENT DOCUMENTS

| | | | | |
|---|---|---|---|---|
| 5,279,484 | A * | 1/1994 | Zimmermann | B64G 1/12 244/171.1 |
| 5,857,323 | A * | 1/1999 | Beveridge | F02K 9/52 239/424.5 |
| 2008/0264372 | A1 * | 10/2008 | Sisk | F02K 9/42 123/144 |
| 2012/0060464 | A1 * | 3/2012 | Grote | F02K 9/64 60/206 |
| 2014/0260186 | A1 * | 9/2014 | Bahn | F02K 9/42 60/257 |
| 2015/0128597 | A1 * | 5/2015 | Schlak | F03B 13/00 60/719 |
| 2015/0251766 | A1 * | 9/2015 | Atkey | B64D 13/08 244/13 |
| 2015/0330869 | A1 * | 11/2015 | Ziarno | G01M 15/14 701/34.4 |
| 2016/0076461 | A1 * | 3/2016 | Kawai | F02C 9/40 60/772 |

OTHER PUBLICATIONS

"Space Station Technology Summary", Iacabucci et al., 1989 (cited in DE Search Report).
NASA Technical Memorandum 113157 (Cited on p. 1 of Specification).
NASA Technical Memorandum 105249 (Cited on p. 2 of Specification).
German Examination Report for corresponding German Patent Application No. 102016208730.4 dated Jul. 15, 2020.
R. Iacabucci et al., "Space Station Technology Summary" JANNAF Propulsion Meeting, vol. 1, Chemical Propulsion Information Agency, Laurel, MD, 1989, pp. 457-470.

* cited by examiner

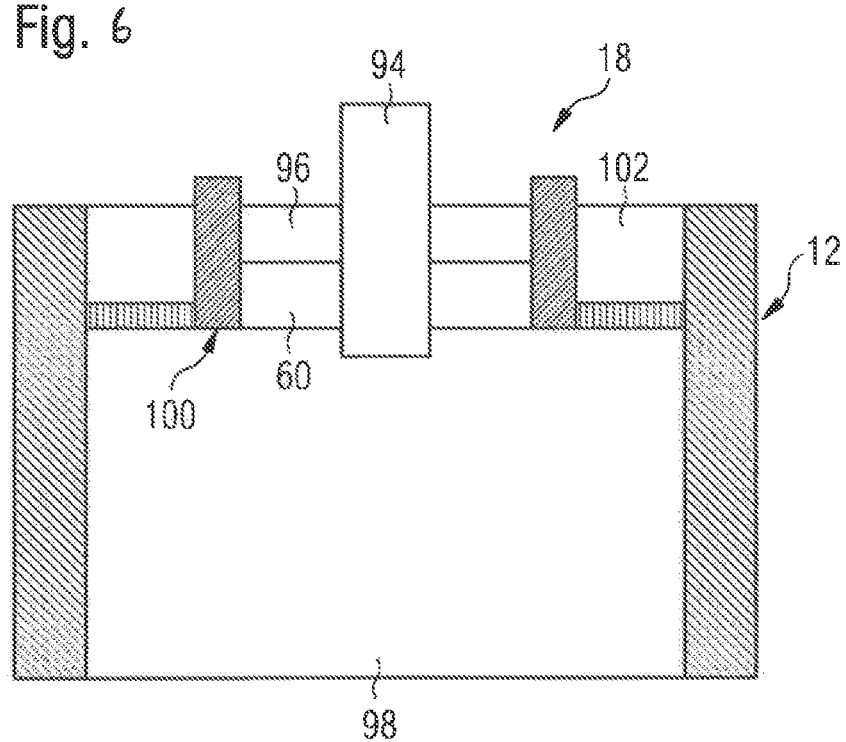

ROCKET PROPULSION SYSTEM AND METHOD FOR OPERATING A ROCKET PROPULSION SYSTEM

CROSS-REFERENCES TO RELATED APPLICATIONS

This application claims the benefit of the German patent application No. 10 2016 208 730.4 filed on May 20, 2016, the entire disclosures of which are incorporated herein by way of reference.

BACKGROUND OF THE INVENTION

The invention relates to a rocket propulsion system and a method for operating such a rocket propulsion system.

Rocket engines operated using hydrogen characterize known propulsion systems for spacecraft. In rocket engines of this kind, hydrogen is burned with oxygen and thrust is generated thereby. These propulsion systems are used, for example, in the launch vehicles of the Ariane series, in which a rocket propulsion system operated using liquid hydrogen and liquid oxygen is formed as the main stage. The hydrogen and the oxygen are stored in hydrogen and oxygen tanks provided for this.

Furthermore, so-called water electrolysis propulsion systems are known, such as from the NASA Technical Memorandum 113157, for example, which can be used in satellites. In a water electrolysis propulsion system of this kind, water is split by electrolysis into hydrogen and oxygen. The hydrogen and oxygen thus produced are then burned in a combustion chamber of an engine to generate thrust. The water to be split by electrolysis can be stored at room temperature, while liquid hydrogen and liquid oxygen have to be stored in cryogenic conditions. This permits a reduced outlay on storage of the water over an entire mission time of several years.

By using hydrogen as fuel in rocket propulsion, a high energy yield and thus a high specific impulse of the rocket propulsion can be attained. However, the disadvantage of this high energy yield is that in the combustion of hydrogen, high combustion temperatures are reached, which in the case of stoichiometric combustion of hydrogen, in particular, leads to high thermal loading of the materials used in a rocket propulsion. This is a problem in water electrolysis propulsion systems in particular, as here hydrogen and oxygen are produced in a stoichiometric mixture ratio.

To limit the combustion temperatures in such systems, a sub-stoichiometric oxygen-hydrogen mixture is normally burned, such as disclosed in the NASA Technical Memorandum 105249, for example. Any remaining oxygen can then be used as cold gas and discharged to an environment of the water electrolysis propulsion system.

The efficiency to be achieved and the power of such rocket propulsion systems are substantially a function of the mixture ratio of oxygen to hydrogen of the oxygen-hydrogen mixture to be ignited in the combustion chamber.

SUMMARY OF THE INVENTION

An object of the invention is to provide a rocket propulsion system and a method for operating a rocket propulsion system, which facilitate an increase in the power of such rocket propulsion systems with lower thermal loading.

A rocket propulsion system comprises a combustion chamber, which is provided to burn a fuel mixture. To generate thrust, the combustion chamber can be connected to a thruster, to which exhaust gases produced in the combustion chamber by combustion of the fuel mixture are supplied. The thruster can be provided to accelerate the exhaust gases produced in the combustion chamber on their exit from the combustion chamber as far as an exit opening of the thruster and then to discharge them to an environment of the rocket propulsion system at high exit velocities.

The rocket propulsion system is provided to use a hydrogen-oxygen-coolant mixture as a fuel mixture, which is burned in the combustion chamber to generate thrust. To supply the hydrogen-oxygen-coolant mixture, the rocket propulsion system comprises a hydrogen-oxygen supply system connected to the combustion chamber, which system is configured to conduct hydrogen and oxygen into the combustion chamber, and a coolant supply system connected to the combustion chamber, which system is configured to conduct a combustible coolant into the combustion chamber. An ignition system of the rocket propulsion system is configured to initiate combustion of the hydrogen-oxygen-coolant mixture in the combustion chamber.

By burning a hydrogen-oxygen-coolant mixture in the combustion chamber, the rocket propulsion system attains a higher specific impulse and higher power at lower combustion temperatures in the combustion chamber. In other words, compared with known rocket propulsions, in which a sub-stoichiometric hydrogen-oxygen mixture is burned in the combustion chamber, the present invention makes it possible by the combustion of the hydrogen-oxygen-coolant mixture that lower combustion temperatures prevail in the combustion chamber to provide a certain power or a certain specific impulse. The thermal load on rocket propulsion components can thus be reduced, without thereby reducing the power or the specific impulse of the rocket propulsion.

The coolant supply system is preferably configured to conduct a liquid coolant into the combustion chamber. The coolant can comprise a liquid fuel, in particular from the group of alcohols, such as methanol, for example. Alternatively or in addition, the coolant can contain a liquid gas, in particular from the group of alkanes, such as ethane, propane, etc., and/or from the group of alkenes, such as ethene, propene, etc., and/or from the group alkynes, such as ethyne, propyne etc.

The coolant can be introduced into the combustion chamber so that the coolant forms a reactive cooling film, in particular along an inner surface of a combustion chamber wall. In other words, the coolant can form a low-oxidizer cooling film in front of the combustion chamber wall during operation of the rocket propulsion system. This has the effect that reductive conditions can prevail along the combustion chamber wall and thus a reaction of the combustion chamber wall with oxygen can be prevented. At the same time, lower combustion temperatures can be attained by this in the region of the combustion chamber wall in operation of the rocket propulsion system. The coolant supply system can be provided so that the coolant to be conducted into the combustion chamber forms a cooling film, which encloses a gas core containing a hydrogen-oxygen mixture, in particular an oxygen-rich or stoichiometric hydrogen-oxygen mixture, in the combustion chamber. Higher combustion temperatures can thus be reached locally in the combustion chamber in the region of the gas core. Due to the cooling film enclosing the gas core, thermal insulation can be provided between the gas core having high combustion temperatures and the combustion chamber wall. The thermal load on the combustion chamber wall can thus be reduced during the operation of the rocket propulsion system.

The rocket propulsion system proposed here makes it possible that higher combustion temperatures can be attained in the combustion chamber without thereby exceeding a permissible thermal loading of the materials used in the combustion chamber. A fuel mixture with a higher mixture ratio of oxygen to hydrogen can be burned accordingly and thus a higher efficiency of the rocket propulsion system can be achieved.

The hydrogen-oxygen supply system can be configured to conduct hydrogen and oxygen in an as a whole stoichiometric mixture ratio into the combustion chamber.

In a further development, the hydrogen-oxygen supply system can comprise an electrolysis unit, which is configured to split water supplied to the electrolysis unit via a water line from a water storage facility into hydrogen and oxygen by electrolysis. Hydrogen and oxygen can be produced accordingly in a stoichiometric ratio in the hydrogen-oxygen supply system and conducted into the combustion chamber. The hydrogen produced in the electrolysis unit can be supplied via a hydrogen line of the hydrogen-oxygen supply system to the combustion chamber. Furthermore, the hydrogen-oxygen supply system can comprise an oxygen line, which is configured to supply the oxygen produced in the electrolysis unit to the combustion chamber.

The hydrogen-oxygen supply system can have a hydrogen storage facility connected to the hydrogen line to store the hydrogen produced in the electrolysis unit. A hydrogen supply line of the hydrogen-oxygen supply system can be configured to supply the hydrogen from the hydrogen storage facility to the combustion chamber. A hydrogen supply valve can be provided in the hydrogen supply line that is configured to control a hydrogen supply to the combustion chamber. The hydrogen-oxygen supply system can further contain an oxygen storage facility connected to the oxygen line, which facility can be configured to store the oxygen produced in the electrolysis unit. An oxygen supply line of the hydrogen-oxygen supply system can be configured to conduct the oxygen from the oxygen storage facility into the combustion chamber. An oxygen supply valve can be provided in the oxygen supply line that can be configured to control an oxygen supply to the combustion chamber.

Alternatively or in addition, the hydrogen-oxygen supply system can have a hydrogen-oxygen mixture storage facility for storing a hydrogen-oxygen mixture. The hydrogen-oxygen mixture storage facility can be connected to the electrolysis unit via the oxygen line and the hydrogen line and be configured to store the hydrogen and oxygen produced in the electrolysis unit in the form of the hydrogen-oxygen mixture. The hydrogen-oxygen supply system can further comprise a hydrogen-oxygen mixture line, which can be configured to conduct the hydrogen-oxygen mixture from the hydrogen-oxygen mixture storage facility into the combustion chamber. A hydrogen-oxygen mixture supply valve can be provided in the hydrogen-oxygen mixture line, which valve can be configured to control a hydrogen-oxygen mixture supply to the combustion chamber.

Due to the provision of the hydrogen-oxygen mixture storage facility, the hydrogen and oxygen to be introduced into the combustion chamber can be stored in a common storage facility. Compared with known devices with separate hydrogen and oxygen storage facilities, the rocket propulsion system described here can have a simpler construction and a lower weight.

The coolant supply system is configured to conduct the coolant into the combustion chamber to form the hydrogen-oxygen-coolant mixture. In a further development, the coolant system can comprise a coolant storage facility for storing the coolant. A coolant line of the coolant supply system can be configured to conduct the coolant from the coolant storage facility into the combustion chamber. In the coolant line a coolant supply valve of the coolant supply system can be provided that can be configured to control a coolant supply to the combustion chamber.

The coolant storage facility of the coolant supply system can be arranged with the water storage facility of the hydrogen-oxygen supply system in a common container. In particular, the coolant storage facility of the coolant supply system and the water storage facility of the hydrogen-oxygen supply system can be provided in separate areas of a diaphragm tank, wherein the area of the diaphragm tank that forms the coolant storage facility, and in which the coolant can be stored under pressure, can act with pressure on the other area of the diaphragm tank forming the water storage facility. The pressurization can take place through the natural vapor pressure of the coolant. This has the effect that no additional conveying means are required to pressurize and convey the water or the coolant.

To initiate the combustion of the hydrogen-oxygen-coolant mixture introduced into the combustion chamber, the ignition system is provided in the rocket propulsion system. In one embodiment of the rocket propulsion system, the ignition system can comprise a catalyst chamber arranged in the combustion chamber, a hydrogen supply duct and an oxygen supply duct. The ignition system can be configured so that the catalyst chamber can be supplied via the hydrogen supply duct and the oxygen supply duct with hydrogen and oxygen, in particular in a sub-stoichiometric mixture ratio of oxygen to hydrogen.

The catalyst chamber is preferably configured to initiate combustion of the hydrogen-oxygen mixture introduced into the catalyst chamber by means of a catalyst. In other words, the catalyst chamber of the ignition system can form a flow section of the oxygen-hydrogen mixture in which the activation energy for initiating the combustion of the oxygen-hydrogen mixture supplied to the catalyst chamber is reduced by a catalyst. Since the hydrogen-oxygen mixture introduced into the catalyst chamber preferably has a sub-stoichiometric mixture ratio of oxygen to hydrogen, the gases exiting the catalyst chamber can comprise unburned hydrogen.

In a further development, the catalyst chamber can comprise a flashback arrestor, which can be configured to prevent an ignition of the hydrogen and oxygen flowing in the hydrogen supply duct and the oxygen supply duct. The flashback arrestor can be arranged in the region of an entrance area of the catalyst chamber, via which area hydrogen and oxygen can be supplied to the catalyst chamber.

Downstream of an exit area of the catalyst chamber, an overall combustion section can be provided in the combustion chamber. The term "downstream" refers here to the direction of the gases exiting the catalyst chamber. The gases exiting the catalyst chamber, which can, in particular, comprise unburned hydrogen, the oxygen flowing through the oxygen supply duct and/or coolant introduced into the combustion chamber via the coolant supply system, which can form the hydrogen-oxygen-cooling film mixture, can be supplied to the overall combustion section. The catalyst chamber is preferably formed so that the gases exiting the catalyst chamber into the overall combustion section have a temperature that is adequate for initiating the combustion of the hydrogen-oxygen-cooling film mixture introduced into the combustion chamber.

The hydrogen supply duct can be configured to conduct the hydrogen supplied to the combustion chamber into the catalyst chamber and/or the overall combustion section in the combustion chamber. The hydrogen supply duct can run substantially perpendicular to the entrance area of the catalyst chamber and open into the catalyst chamber in particular in the region of the entrance area of the catalyst chamber.

The oxygen supply duct can be provided to conduct the oxygen supplied to the combustion chamber into the catalyst chamber and/or the overall combustion section in the combustion chamber. To form the hydrogen-oxygen-cooling film mixture in the overall combustion section, the oxygen supply duct can be directly connected to the overall combustion section and can, in particular, open into the overall combustion section. The oxygen supply duct preferably extends along a catalyst chamber wall facing the oxygen supply duct. This has the effect that oxygen flowing along the catalyst chamber wall is heated and can thus cool the catalyst chamber.

The oxygen supply duct can further be provided with an oxygen supply opening, which can be formed in the wall of the catalyst chamber facing the oxygen supply duct. The oxygen supply duct can be connected to the catalyst chamber via the oxygen supply opening. The oxygen supply opening can be configured to introduce oxygen into the catalyst chamber. The oxygen supply opening is preferably formed in a region of the entrance area to the catalyst chamber.

The ignition system can further comprise a premixing chamber, which can be fitted to the catalyst chamber upstream, i.e., opposing the direction of the gases flowing into the catalyst chamber, and can open into the catalyst chamber in the region of the entrance area to the catalyst chamber. Oxygen flowing through the oxygen supply opening and hydrogen flowing through the hydrogen supply duct can be supplied to the premixing chamber. The premixing chamber can be configured to mix the oxygen flowing through the oxygen supply opening and the hydrogen flowing through the hydrogen supply duct with one another to produce the hydrogen-oxygen mixture to be introduced into the catalyst chamber.

An end section of the hydrogen supply duct can form a premixing chamber section providing the premixing chamber, wherein the premixing chamber section opens into the catalyst chamber in the region of the entrance area to the catalyst chamber. The oxygen supply opening can be formed in the premixing chamber section in a wall of the hydrogen supply duct facing the oxygen supply duct. The premixing chamber can have a flow cross section that becomes larger in the flow direction. The hydrogen-oxygen mixture flowing through the premixing chamber can thus be expanded and decelerated, which can lead to improved mixing of the hydrogen-oxygen mixture.

In one embodiment, the oxygen supply duct can comprise a cross section, in particular a flow cross section, through which the catalyst chamber can pass. The cross section of the oxygen supply duct can be formed as an annular cross section. The cross section of the oxygen supply duct can further be formed as a hollow cross section with an outer contour and an inner contour, wherein the outer contour and/or inner contour can be formed as a contour of a polygon, a circle and/or an ellipsis.

In another embodiment, the catalyst chamber can have a cross section, in particular a flow cross section, through which the oxygen supply duct can pass. The cross section of the catalyst chamber can be formed as an annular cross section. The cross section of the catalyst chamber can further be formed as a hollow cross section with an outer contour and an inner contour, wherein the outer contour and/or inner contour can be formed as a contour of a polygon, a circle and/or an ellipsis.

To conduct coolant supplied to the combustion chamber via the coolant supply system into the overall combustion section, the rocket propulsion system can comprise a coolant duct. To this end the coolant duct can open into the overall combustion section arranged downstream of the exit area of the catalyst chamber. The coolant duct can be configured to conduct coolant along an outer surface of the ignition system into the overall combustion section. A cooling function to cool the ignition system can be provided by this, in order to dissipate from the catalyst chamber, the heat input induced in the catalyst chamber by combustion of the hydrogen-oxygen mixture.

The coolant duct can be arranged between the outer surface of the ignition system and an inner surface of the combustion chamber. The outer surface of the ignition system can be formed by an outer surface of the catalyst chamber facing the coolant duct. Alternatively, the outer surface of the ignition system can be formed by an outer surface of the oxygen supply duct facing the coolant duct.

In a further development, the coolant duct can be formed in the form of an annular gap defined between the outer surface of the ignition system and the inner surface of the combustion chamber. Alternatively, the coolant duct can comprise a plurality of coolant single lines, which extend between the outer surface of the ignition system and the inner surface of the combustion chamber.

In an alternative embodiment of the rocket propulsion system, the ignition system can comprise an igniter and at least one supply duct to supply hydrogen and oxygen to a mixture combustion section of the combustion chamber. The mixture combustion section can be formed downstream of the supply duct. The term "downstream" refers here to a direction of flow of the hydrogen-oxygen mixture in the supply line. The at least one supply duct can run, in particular, substantially perpendicular to an entrance area of the mixture combustion section and open into the mixture combustion section in the region of the entrance area to the mixture combustion section. The at least one supply duct can further be formed so that it encloses the igniter.

A coolant supply duct of the rocket propulsion system can be configured to conduct the coolant supplied to the combustion chamber by the coolant supply system into the mixture combustion section. The coolant supply duct can run substantially perpendicular to the entrance area to the mixture combustion section. Furthermore, the coolant supply duct can open into the mixture combustion section in the region of the entrance area to the mixture combustion section. Alternatively or in addition, the coolant supply duct can be arranged between an outer surface of the ignition system and an inner surface of the combustion chamber.

A method for operating a rocket propulsion system comprises a step of conducting hydrogen and oxygen into a combustion chamber. A combustible coolant is further conducted into the combustion chamber. The method further comprises a step of initiating combustion of the hydrogen-oxygen-coolant mixture in the combustion chamber.

BRIEF DESCRIPTION OF THE DRAWINGS

Preferred embodiments of the invention are explained in greater detail below with reference to the enclosed schematic drawings, wherein FIG. 6 shows an enlarged longitudinal section of the combustion chamber shown in FIGS. 2 and 5 of the rocket propulsion system of the third and a fourth embodiment.

DETAILED DESCRIPTION OF THE PREFERRED EMBODIMENTS

Figure 2:
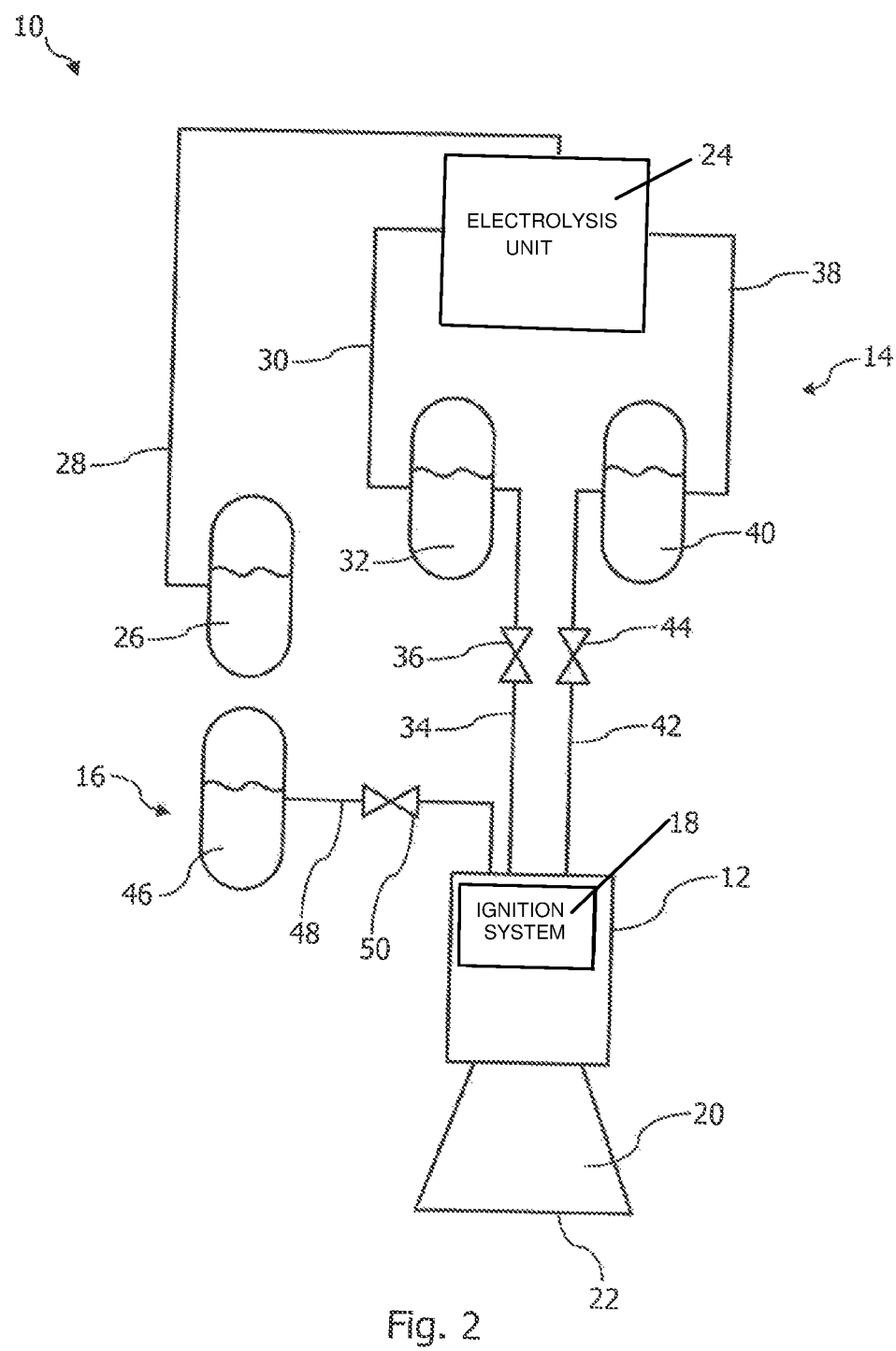
FIG. 2 shows a schematic view of a rocket propulsion system of a first embodiment.

FIG. 2 shows a first embodiment of a rocket propulsion system 10, which comprises a combustion chamber 12, a hydrogen-oxygen supply system 14 connected to the combustion chamber 12 and a coolant supply system 16 connected to the combustion chamber 12. The hydrogen-oxygen supply system 14 is configured to conduct hydrogen and oxygen into the combustion chamber 12. The coolant supply system 16 is configured to conduct a combustible coolant into the combustion chamber 12.

The rocket propulsion system 10 further comprises an ignition system 18 arranged in the combustion chamber 12, which system is configured to initiate combustion of the hydrogen-oxygen-coolant mixture in the combustion chamber 12, wherein the hydrogen-oxygen-coolant mixture is formed by the hydrogen and oxygen introduced into the combustion chamber 12 and the coolant introduced into the combustion chamber 12.

Figure 1:
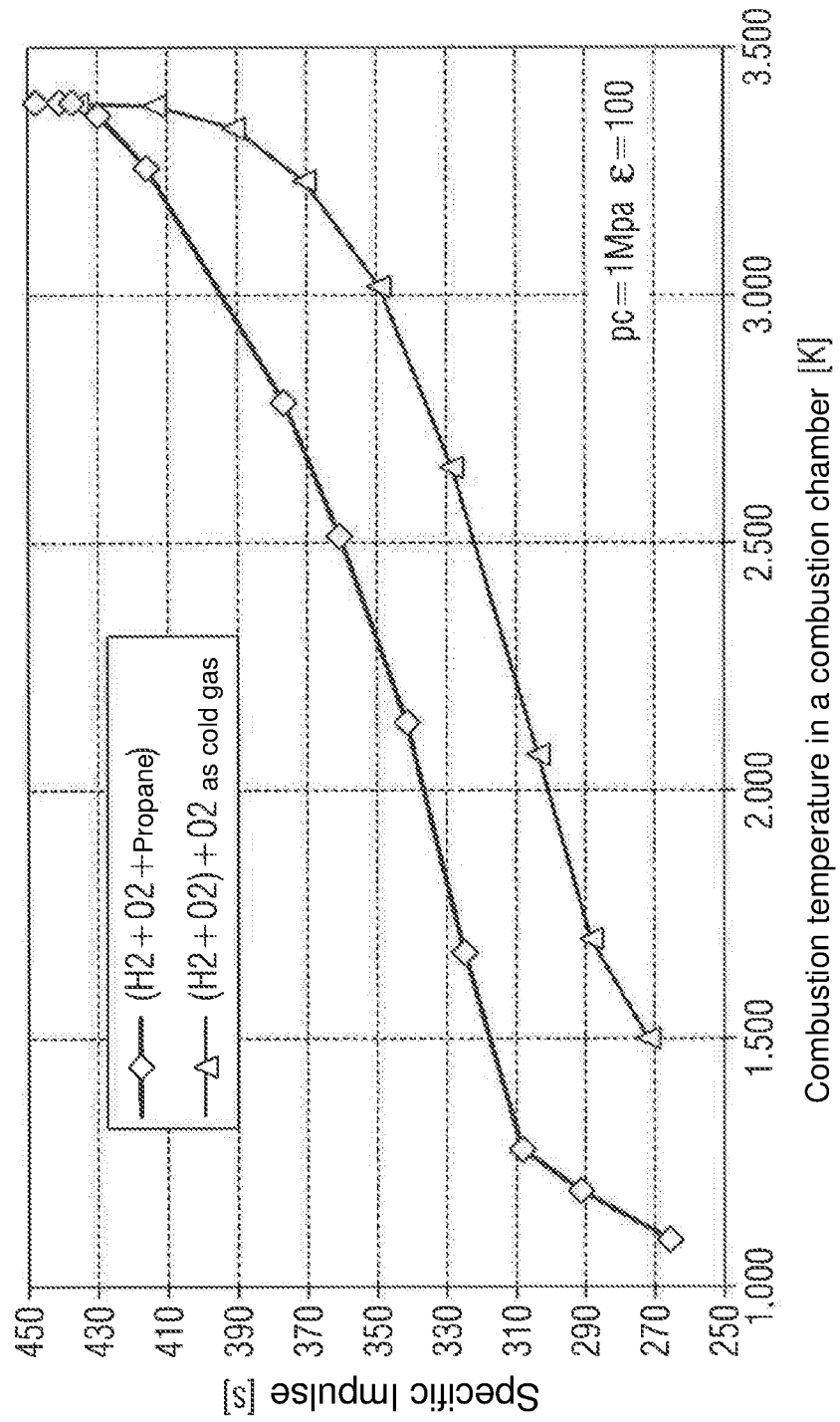
FIG. 1 shows a diagram that illustrates the connection between a combustion temperature in a combustion chamber and a specific impulse of a rocket propulsion system for a rocket propulsion system according to the invention and a rocket propulsion system known from the prior art.

By burning a hydrogen-oxygen-coolant mixture in the combustion chamber 12, the rocket propulsion system 10 attains a higher specific impulse and a higher power at lower combustion temperatures in the combustion chamber. This connection between the combustion temperature in the combustion chamber 12 and the specific impulse of the rocket propulsion system 10 is shown in FIG. 1, which compares the specific impulse as a function of the combustion temperature in the combustion chamber 12 for the rocket propulsion system 10 with a currently known rocket propulsion system in a diagram. The abscissa of the diagram shows the combustion temperature and the ordinate of the diagram the specific impulse at a combustion chamber pressure of pc=1 Mpa and an expansion ratio of ε=100. A first curve shown in the diagram describes an embodiment of the rocket propulsion system 10 in which propane is used as coolant, so that a hydrogen-oxygen-propane mixture is burned in the combustion chamber 12. A second curve illustrates a rocket propulsion system known from the prior art, in which a sub-stoichiometric hydrogen-oxygen mixture is burned in a combustion chamber and the remaining oxygen is discharged as cold gas.

The combustion chamber 12 of the rocket propulsion system 10 is connected to a thruster 20, to which the exhaust gases arising in the combustion chamber 12 due to combustion of the hydrogen-oxygen-coolant mixture are supplied. The thruster 20 is provided to accelerate the exhaust gases produced in the combustion chamber 12 on their exit from the combustion chamber 12 as far as an exit opening 22 of the thruster 20 and thereupon to discharge them to an environment of the rocket propulsion system 10 at a high exit velocity, in order to generate thrust.

The coolant supply system 16 shown here is configured to conduct a liquid fuel and/or a liquid gas into the combustion chamber 12 as coolant.

The hydrogen-oxygen supply system 14 comprises an electrolysis unit 24, which is configured to split water supplied to the electrolysis unit 24 from a water storage facility 26 via a water line 28 into hydrogen and oxygen by electrolysis. A hydrogen line 30 of the hydrogen-oxygen supply system 14 is configured to conduct the hydrogen produced in the electrolysis unit 24 into the combustion chamber 12. The hydrogen line 30 is connected to a hydrogen storage facility 32, which is configured to store the hydrogen produced in the electrolysis unit 24 before this is conducted via a hydrogen supply line 34 into the combustion chamber 12. Provided in the hydrogen supply line 34 is a hydrogen supply valve 36, which is configured to control a hydrogen supply to the combustion chamber 12.

An oxygen line 38 of the hydrogen-oxygen supply system 14 is configured to conduct the oxygen produced in the electrolysis unit 24 into the combustion chamber 12. The oxygen line 38 is connected to an oxygen storage facility 40, which is configured to store the oxygen produced in the electrolysis unit 24 before this is conducted via an oxygen supply line 42 into the combustion chamber 12. Provided in the oxygen supply line 42 is an oxygen supply valve 44, which is configured to control an oxygen supply to the combustion chamber 12.

The hydrogen-oxygen supply system 14 is preferably configured to produce hydrogen and oxygen in a substantially stoichiometric mixture ratio and conduct it into the combustion chamber 12.

The coolant supply system 16 comprises a coolant storage facility 46 for storing the coolant and a coolant line 48 connected to the coolant storage facility 46, via which line the coolant can be supplied to the combustion chamber 12. Provided in the coolant line 48 is a coolant supply valve 50, which is configured to control a coolant supply to the combustion chamber 12.

Figure 3:
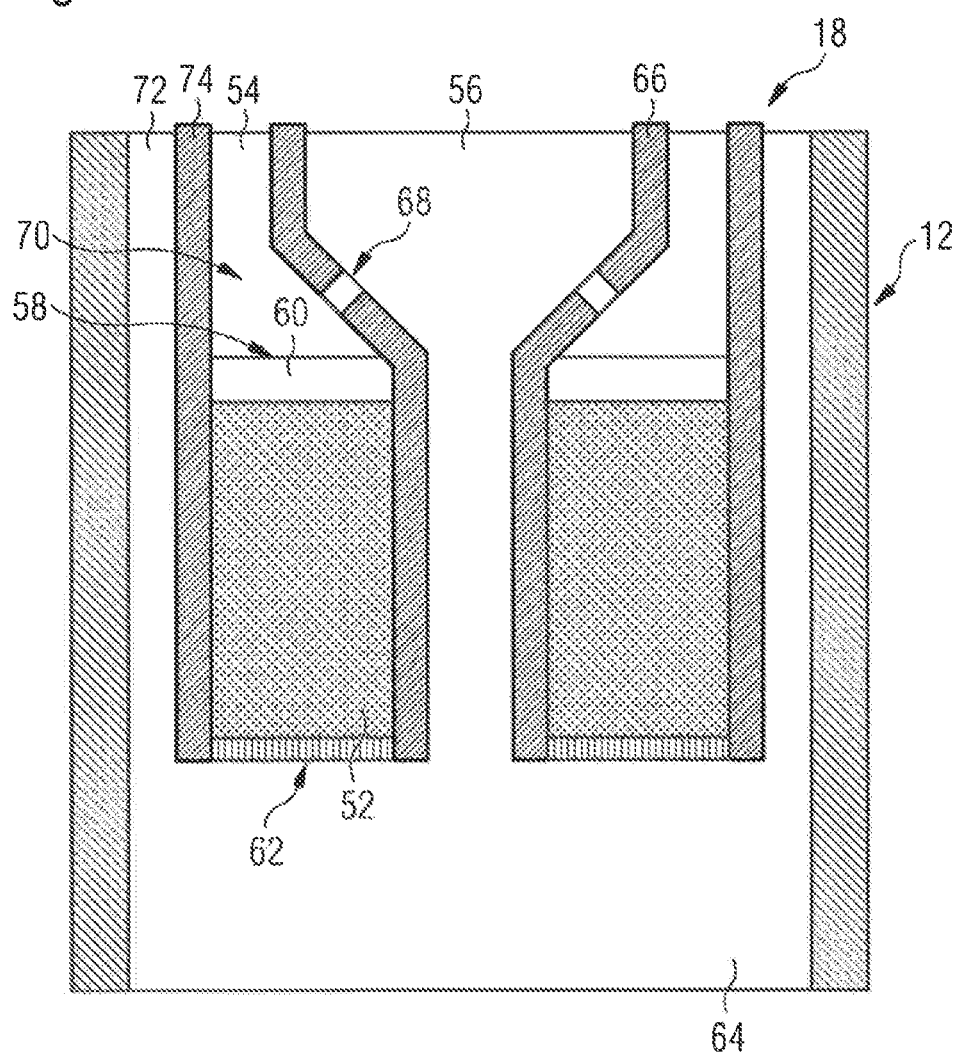
FIG. 3 shows an enlarged longitudinal section of a combustion chamber shown in FIG. 2 of the rocket propulsion system of the first embodiment.

FIG. 3 shows an enlarged longitudinal section of the combustion chamber 12 shown in FIG. 2 with the ignition system 18 arranged therein. The ignition system 18 comprises a catalyst chamber 52 arranged in the combustion chamber 12, a hydrogen supply duct 54 and an oxygen supply duct 56. The ignition system 18 is configured to supply the catalyst chamber 52 with hydrogen and oxygen, in particular in a sub-stoichiometric mixture ratio, via the hydrogen supply duct 54 and the oxygen supply duct 56. The catalyst chamber 52 is configured to initiate combustion of the hydrogen-oxygen mixture introduced into the catalyst chamber 52 by means of a catalyst. In the region of an entrance area 58 to the catalyst chamber 52, the catalyst chamber 52 comprises a flashback arrestor 60. The gases exiting the catalyst chamber 52 are supplied via an exit area 62 of the catalyst chamber 52 to an overall combustion section 64 in the combustion chamber 12, which section is arranged downstream of the exit area 62 of the catalyst chamber 52. The overall combustion section 64 is formed so that the gases exiting from the catalyst chamber 52, oxygen flowing through the oxygen supply duct 56 and coolant supplied to the combustion chamber 12 via the coolant supply system 18 can be supplied to this. Since the hydrogen-oxygen mixture introduced into the catalyst chamber 52 preferably has a sub-stoichiometric mixture ratio of oxygen to hydrogen, the gases exiting the catalyst chamber 52 comprise unburned hydrogen. The gases supplied to the overall combustion section 64 accordingly form the hydrogen-oxygen-coolant mixture.

The catalyst chamber 52 is preferably formed so that the gases exiting into the overall combustion section 64 from the catalyst chamber 52 have a temperature that is adequate for initiating the combustion of the hydrogen-oxygen-coolant mixture introduced into the combustion chamber 12.

The hydrogen supply duct 54 is configured to conduct the hydrogen supplied to the combustion chamber 12 into the catalyst chamber 52. The hydrogen supply duct 54 runs substantially perpendicular to the entrance area 58 of the catalyst chamber 52 and opens into the catalyst chamber 52 in the region of the entrance area 58 of the catalyst chamber 52.

The oxygen supply duct 56 is configured to conduct the oxygen supplied to the combustion chamber 12 into the catalyst chamber 52 and the overall combustion section 64 in the combustion chamber 12. The oxygen supply duct 56 further extends along an inner catalyst chamber wall 66 facing the oxygen supply duct 56, wherein the oxygen supply duct 56 is connected to the catalyst chamber 52 by an oxygen supply opening 68, which is formed in the inner catalyst chamber wall 66 facing the oxygen supply duct 56. The oxygen supply opening 68 is formed in the region of the entrance area 58 of the catalyst chamber 52 and is configured to conduct oxygen into the catalyst chamber 52. To conduct oxygen into the overall combustion section 64, the oxygen supply duct 56 further opens into the overall combustion section 64.

An end section of the hydrogen supply duct 54 opening into the catalyst chamber 52 is formed as a premixing chamber section 70, into which the oxygen supply opening 68 opens. The premixing chamber section 70 is configured to mix the oxygen flowing through the oxygen supply opening 68 and the hydrogen flowing through the hydrogen supply duct 54 with one another and thus produce the hydrogen-oxygen mixture to be introduced into the catalyst chamber 52. The premixing chamber section 70 has a flow cross section that widens in the direction of the catalyst chamber 52.

In the embodiment of the rocket propulsion system 10 shown here, the catalyst chamber 52 has an annular cross section, through which the oxygen supply duct 56 passes, wherein the oxygen supply duct 56 has a circular cross section.

The rocket propulsion system 10 further comprises a coolant duct 72, which is configured to conduct coolant supplied to the combustion chamber 12 into the overall combustion section 64. The coolant duct 72 is arranged between an outer surface of the ignition system 18 and an inner surface of the combustion chamber 12 and opens into the overall combustion section 64 arranged downstream of the exit area 62 of the catalyst chamber 52. In the embodiment of the rocket propulsion system 10 shown here, the outer surface of the ignition system 18 is formed by an outer surface of an outer catalyst chamber wall 74 facing the coolant duct 72. The coolant duct 72 is formed here in the form of an annular gap defined between the outer surface of the ignition system 18 and the inner surface of the combustion chamber 12. Alternatively, the coolant duct 72 can comprise a plurality of coolant single lines, which extend between the outer surface of the ignition system 18 and the inner surface of the combustion chamber 12. The plurality of coolant single lines can be formed so that swirl is induced into the coolant to be conducted into the overall combustion section 64. The dwell time of the coolant on the inner surface of the combustion chamber wall 12 can thus be increased and the cooling function provided by the coolant in the combustion chamber 12 can be improved by this.

Figure 4:
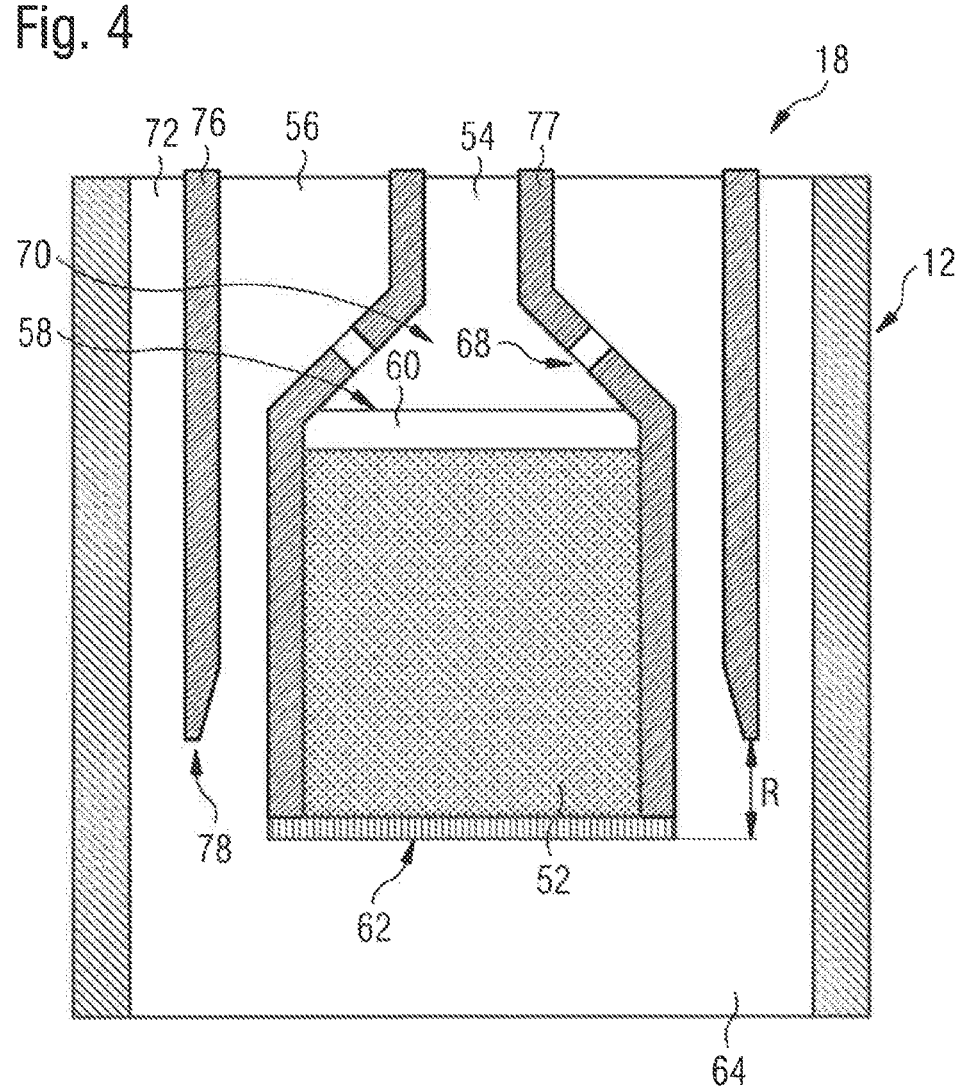
FIG. 4 shows an enlarged longitudinal section of the combustion chamber shown in FIG. 2 of a rocket propulsion system of a second embodiment.

A combustion chamber 12 of a second embodiment of the rocket propulsion system 10 is shown in FIG. 4. Compared with the embodiment shown in FIG. 3, the ignition system 18 shown here has an oxygen supply duct 56, which encloses the catalyst chamber 52 at least in sections. In other words, the oxygen supply duct 56 shown here has an annular cross section, through which the catalyst chamber 52 passes. The outer surface of the ignition system 18, along which surface the coolant duct 72 extends, is accordingly formed by an outer surface of an oxygen supply duct wall 76 facing the coolant duct 72. Alternatively, the ignition system 18 can comprise a plurality of oxygen single lines, which is configured to conduct the oxygen supplied to the combustion chamber 12 into the catalyst chamber 52 and the overall combustion section 64 in the combustion chamber 12. The plurality of oxygen single lines can run along an outer wall of the catalyst chamber.

The oxygen supply opening 68 is formed here in an outer catalyst chamber wall 77. As shown in FIG. 4, an end section 78 of the oxygen supply duct wall 76 facing the overall combustion section 64 is arranged offset by a recess dimension R in the flow direction relative to the exit area 62 of the catalyst chamber 52. In other words, the end section 78 of the oxygen supply duct wall 76 is arranged before the exit area 62 of the catalyst chamber 52 in the flow direction. Alternatively, the end section 78 of the oxygen supply duct wall 76 can be arranged behind the exit area 62 of the catalyst chamber 52 in the flow direction or without any offset relative to this, i.e., with a recess dimension R equal to 0.

In the region of the end section 78 of the oxygen supply duct wall 76, the oxygen supply duct 56 has a flow cross section that becomes larger in the flow direction. An inner surface of the oxygen supply duct wall 76 in the region of the end section 78 is formed inclined in a direction facing away from the catalyst chamber 52. Mixing of the oxygen flowing through the oxygen supply duct 56 with the coolant flowing through the coolant duct 72 in the overall combustion section 64 can be improved by this.

Figure 5:
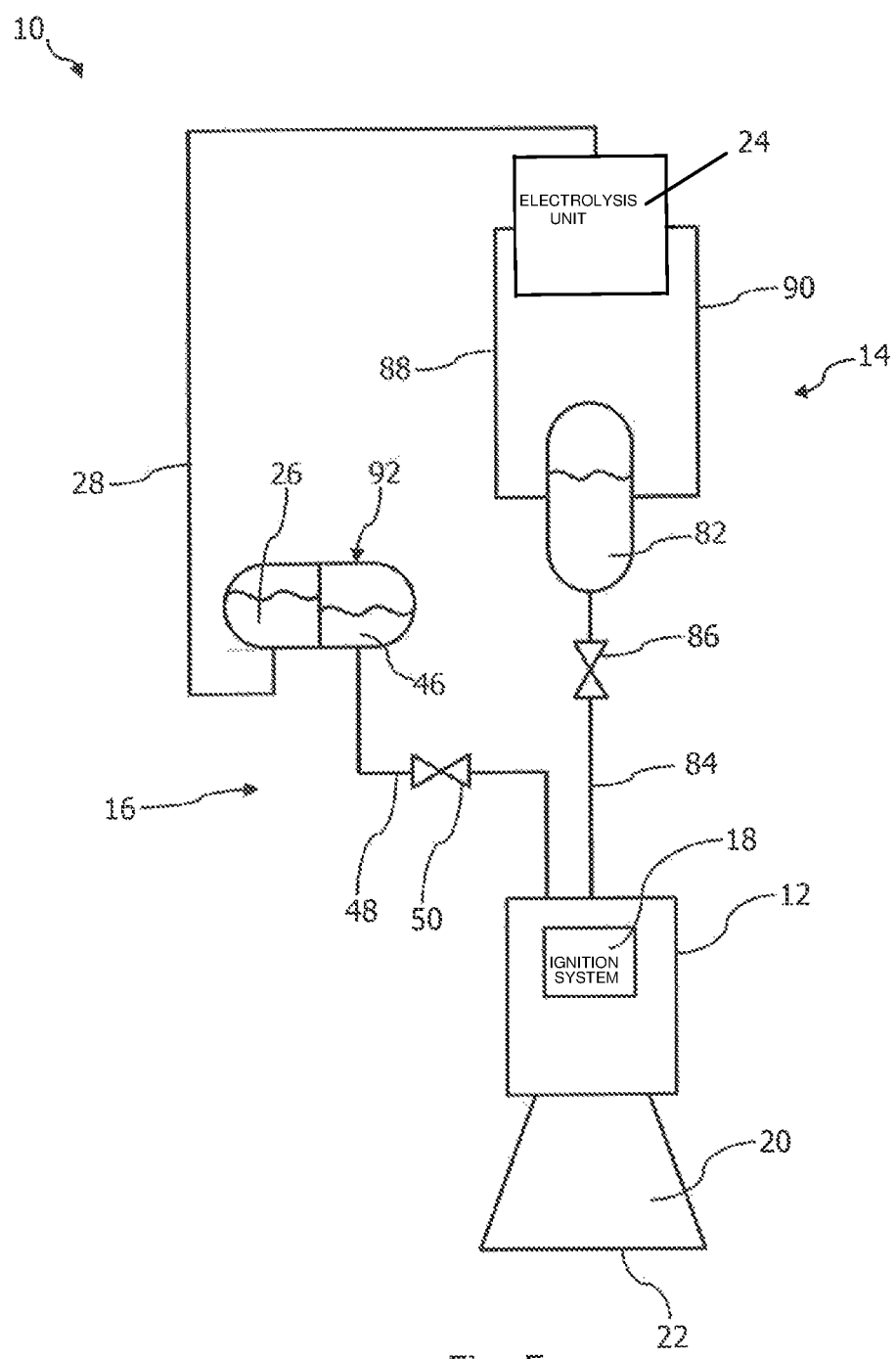
FIG. 5 shows a schematic view of a rocket propulsion system of a third embodiment.

A third embodiment of the rocket propulsion system 10 is shown in FIG. 5, in which the hydrogen-oxygen supply system 14 comprises a hydrogen-oxygen mixture storage facility 82 for storing a hydrogen-oxygen mixture. A hydrogen-oxygen mixture line 84 is configured to conduct the hydrogen-oxygen mixture from the hydrogen-oxygen mixture storage facility 82 into the combustion chamber 12. Provided in the hydrogen-oxygen mixture line 84 is a hydrogen-oxygen mixture supply valve 86, which is configured to control a hydrogen-oxygen mixture supply to the combustion chamber 12. The hydrogen-oxygen mixture storage facility 82 is connected by a hydrogen line 88 and an oxygen line 90 to the electrolysis unit 24.

In the embodiment shown here, the coolant storage facility 46 of the coolant supply system 18 and the water storage facility 26 of the hydrogen-oxygen supply system 14 are arranged in a common container 92.

FIG. 6 shows an enlarged longitudinal section of the combustion chamber 12 shown in FIGS. 2 and 5 of the rocket propulsion system 10. The ignition system 18 comprises an igniter 94 and at least one supply duct 96 to supply hydrogen and oxygen to a mixture combustion section 98 of the combustion chamber 12. The supply duct 96 is configured to conduct the hydrogen supplied to the combustion chamber 12 via the hydrogen supply line 34 and the oxygen supplied to the combustion chamber 12 via the oxygen supply line 42, as shown in FIG. 2, or the hydrogen-oxygen mixture supplied to the combustion chamber 12 via the hydrogen-oxygen mixture line 84, as shown in FIG. 5, into the mixture combustion section 98. The supply duct 96 runs substantially perpendicular to an entrance area 100 of the mixture combustion section 98 and opens into the mixture combustion section 98 in the region of the entrance area 100 to the mixture combustion section 98. As shown in FIG. 6, the supply duct 96 encloses the igniter 94. In other words, the supply duct 96 has an annular cross section, through which the igniter 94 passes. A flashback arrestor 60 is further arranged in the region of an exit area of the supply duct 96.

The rocket propulsion system 10 further comprises a coolant supply duct 102, which runs substantially perpendicular to the entrance area 100 to the mixture combustion section 98 and opens into the mixture combustion section 98 in the region of the entrance area 100 to the mixture combustion section 98. The coolant supply duct 102 is arranged between an outer surface of the ignition system 18 and an inner surface of the combustion chamber wall 12.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A rocket propulsion system comprising:
a combustion chamber of the rocket propulsion system connected to a thruster with an exit opening for generating thrust;
a hydrogen-oxygen supply system connected to the combustion chamber, which hydrogen-oxygen supply system is configured to conduct hydrogen and oxygen into the combustion chamber;
a coolant supply system connected to the combustion chamber, which coolant supply system is configured to supply a combustible coolant to the combustion chamber; and
an ignition system configured to initiate combustion of the hydrogen-oxygen-coolant mixture in the combustion chamber;
wherein the ignition system comprises a catalyst chamber arranged in the combustion chamber, a hydrogen supply duct, and an oxygen supply duct;
wherein the combustion chamber is provided with an overall combustion section located downstream of an exit area of the catalyst chamber, wherein the overall combustion section is configured to be supplied at the same time with gases exiting the catalyst chamber, with oxygen directly supplied by the oxygen supply duct of the ignition system to the overall combustion section, and with coolant supplied to the combustion chamber via the coolant supply system; and
wherein the coolant supply system comprises a coolant duct and wherein the hydrogen supply duct is disposed between the oxygen supply duct and the coolant duct.

2. The rocket propulsion system according to claim 1, wherein the coolant contains a liquid fuel or a liquid gas.

3. The rocket propulsion system according to claim 2, wherein the coolant is selected from the group consisting of alcohols, alkanes, alkenes and alkynes.

4. The rocket propulsion system according to claim 1, wherein the hydrogen-oxygen supply system comprises:
an electrolysis unit configured to split water supplied to the electrolysis unit from a water storage facility via a water line, into hydrogen and oxygen, by electrolysis;
a hydrogen line configured to conduct the hydrogen produced in the electrolysis unit into the combustion chamber; and
an oxygen line configured to conduct the oxygen produced in the electrolysis unit into the combustion chamber.

5. The rocket propulsion system according to claim 1, wherein the coolant supply system comprises a coolant storage facility.

6. The rocket propulsion system according to claim 5, wherein the coolant storage facility is arranged with a water storage facility of the hydrogen-oxygen supply system in a common container.

7. The rocket propulsion system according to claim 1, wherein:
the catalyst chamber is configured to be supplied with hydrogen and oxygen in a sub-stoichiometric mixture ratio via the hydrogen supply duct and the oxygen supply duct; and
the hydrogen supply duct runs substantially perpendicular to an entrance area of the catalyst chamber and opens into the catalyst chamber in the region of the entrance area to the catalyst chamber.

8. The rocket propulsion system according to claim 7, wherein the oxygen supply duct extends along a catalyst chamber wall facing the oxygen supply duct, is connected to the catalyst chamber via an oxygen supply opening, which is formed in the catalyst chamber wall facing the oxygen supply duct and opens into the overall combustion section of the combustion chamber.

9. The rocket propulsion system according to claim 1, wherein the coolant duct is arranged between an outer surface of the ignition system and an inner surface of the combustion chamber and wherein the coolant duct opens into the overall combustion section arranged downstream of the exit area of the catalyst chamber.

10. The rocket propulsion system according to claim 9, wherein the coolant duct is either formed in the form of an annular gap defined between the outer surface of the ignition system and the inner surface of the combustion chamber, or comprises a plurality of coolant single lines which extend between an outer surface of the ignition system and an inner surface of the combustion chamber.

11. A rocket propulsion system comprising:
a combustion chamber of the rocket propulsion system connected to a thruster with an exit opening for generating thrust;
a hydrogen-oxygen supply system connected to the combustion chamber, which hydrogen-oxygen supply system is configured to conduct hydrogen and oxygen into the combustion chamber;

a coolant supply system connected to the combustion chamber, which coolant supply system is configured to supply a combustible coolant to the combustion chamber; and an ignition system configured to initiate combustion of the hydrogen-oxygen-coolant mixture in the combustion chamber;

wherein the ignition system comprises a catalyst chamber arranged in the combustion chamber, a hydrogen supply duct, and an oxygen supply duct; and wherein the combustion chamber is provided with an overall combustion section located downstream of an exit area of the catalyst chamber, wherein the overall combustion section is configured to be supplied at the same time with gases exiting the catalyst chamber, with oxygen directly supplied by the oxygen supply duct of the ignition system to the overall combustion section, and with coolant supplied to the combustion chamber via the coolant supply system; and wherein the catalyst chamber has an annular cross section, through which the oxygen supply duct passes.

12. A method for operating a rocket propulsion system, comprising:

connecting a combustion chamber of the rocket propulsions system to a thruster with an exit opening for generating thrust;

conducting of hydrogen and oxygen into the combustion chamber;

conducting of a combustible coolant into the combustion chamber; and initiating combustion of the hydrogen-oxygen-coolant mixture in the combustion chamber;

wherein the ignition system comprises a catalyst chamber arranged in the combustion chamber, a hydrogen supply duct, and an oxygen supply duct;

wherein the combustion chamber is provided with an overall combustion section located downstream of an exit area of the catalyst chamber, wherein the overall combustion section is supplied, at the same time, with gases exiting the catalyst chamber, with oxygen directly supplied by the oxygen supply duct of the ignition system to the overall combustion section, and with coolant supplied to the combustion chamber via the coolant supply system; and wherein the coolant supply system comprises a coolant duct and wherein the hydrogen supply duct is disposed between the oxygen supply duct and the coolant duct.

* * * * *